(12) United States Patent
O'Sullivan

(10) Patent No.: US 9,388,840 B2
(45) Date of Patent: Jul. 12, 2016

(54) CONTROLLED TORQUE FASTENERS AND METHODS FOR USING SAME

(71) Applicant: Tyco Electronics Corporation, Berwyn, PA (US)

(72) Inventor: Edward O'Sullivan, Cary, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 14/502,050

(22) Filed: Sep. 30, 2014

(65) Prior Publication Data

US 2015/0016917 A1 Jan. 15, 2015

Related U.S. Application Data

(63) Continuation of application No. 13/566,322, filed on Aug. 3, 2012, now Pat. No. 8,875,368.

(51) Int. Cl.
*F16B 31/00* (2006.01)
*F16B 23/00* (2006.01)
*F16B 31/02* (2006.01)

(52) U.S. Cl.
CPC ............... *F16B 31/00* (2013.01); *F16B 23/00* (2013.01); *F16B 31/021* (2013.01); *Y10T 29/49815* (2015.01); *Y10T 29/49817* (2015.01); *Y10T 29/49821* (2015.01); *Y10T 29/49822* (2015.01);
(Continued)

(58) Field of Classification Search
CPC ........ F16B 31/00; F16B 23/00; F16B 31/021; Y10T 29/49948; Y10T 29/49954; Y10T 29/49822; Y10T 29/49947; Y10T 29/49821; Y10T 29/49815; Y10T 29/49817; Y10T 29/49881
See application file for complete search history.

(56) References Cited

U.S. PATENT DOCUMENTS

| 297,145 | A | * | 4/1884 | Blakeley | ............ | B61D 27/0081 292/345 |
| 5,256,015 | A | | 10/1993 | St. Clair | | |

(Continued)

FOREIGN PATENT DOCUMENTS

| AU | 2008 202 943 A1 | 2/2009 |
| CN | 1210456 A | 3/1999 |

(Continued)

OTHER PUBLICATIONS

"Aluminum ShearBolt Connectors #2 AWG Compact to 1000 kcmil Concentric," 9-1773440-4 E247 (Apr. 2012), Raychem, Tyco Electronics Corporation (2 pages).

(Continued)

*Primary Examiner* — John C Hong
(74) *Attorney, Agent, or Firm* — Myers Bigel & Sibley, P.A.

(57) ABSTRACT

A controlled torque fastener for use with a substrate includes a first driver engagement feature and a primary fastener portion connected to the first driver engagement feature. The primary fastener portion includes a threaded fastening portion and a second driver engagement feature connected to the threaded fastening portion. The first driver engagement feature is configured to be engaged by a first driver to enable the first driver to tighten the controlled torque fastener onto the substrate until the first driver engagement feature breaks off from the primary fastener portion. The second driver engagement feature includes a socket configured to receive a second driver and to enable the received second driver to apply a torque to the primary fastener portion.

16 Claims, 8 Drawing Sheets

(52) U.S. Cl.
CPC ...... *Y10T 29/49881* (2015.01); *Y10T 29/49947* (2015.01); *Y10T 29/49948* (2015.01); *Y10T 29/49954* (2015.01)

(56) References Cited

U.S. PATENT DOCUMENTS

| | | | |
|---|---|---|---|
| 6,884,124 | B1 | 4/2005 | Luzzi |
| 7,249,982 | B1 | 7/2007 | Craig |
| 7,717,658 | B2 | 5/2010 | Peltier |
| 7,736,187 | B2 | 6/2010 | Yaworski et al. |
| 7,858,883 | B2 | 12/2010 | Seraj et al. |
| 7,901,243 | B1 | 3/2011 | Yaworski |
| 7,918,690 | B2 | 4/2011 | Yaworski et al. |
| 8,030,570 | B2 | 10/2011 | Seraj et al. |
| 2009/0194638 | A1 | 8/2009 | Dennis |

FOREIGN PATENT DOCUMENTS

| | | |
|---|---|---|
| CN | 101529658 A | 9/2009 |
| DE | 26 58 996 A1 | 6/1978 |
| GB | 2 036 908 A | 7/1980 |
| NL | 8 601 192 A | 12/1987 |
| WO | WO 2005/081689 A2 | 9/2005 |

OTHER PUBLICATIONS

"Aluminum ShearBolt Connectors #2 AWG Compact to 1000 kcmil Stranded," TE Connectivity Catalogue Page. (1 page).

"Cable Services," (Oct. 2009). Product Catalogue (11 pages).

"Copper ShearBolt Connectors" Instruction Sheet 408-8894, Feb. 20, 2012, Rev F, Tyco Electronics Corporation (1 page).

"Copper ShearBolt Connectors #2 AWG Compact to 1000 kcmil Concentric," 1654972 E214 (Apr. 2012), Raychem, Tyco Electronics Corporation (2 pages).

"MI6 x 1.5-6g 17A/F 31.75 Long Brass Multi-Shear Bolt with Recessed End" Tyco Electronics UK Ltd., Rev A, PCN No. CB3871-000, Date: Jul. 13, 2006 (1 page).

"Raychem Smart Limiter Cable Protector," 6-1773448-0 E288 (Apr. 2012), Tyco Electronics Corporation (2 pages).

"Sicon—The First Cable Connector System with Stepless Shear Bolts," (2008) Pfisterer (6 pages).

"ShearBolt Connector, Copper, Solid Oil Stop, 2/0 AWG CPT to 500 kcmil CPT" TE Connectivity, Rev H, Drawing No. 1099861, Date: Dec. 7, 2003 (1 page).

"Wrench-Lok® Grounding Grid Connectors" Instruction Sheet 408-9504, Nov. 22, 1995, Rev A, AMP Incorporated, Harrisburg, PA (2 pages).

International Search Report and Written Opinion issued in corresponding PCT Application No. PCT/US2013/053156, mailed Oct. 17, 2013 (13 pages).

Chinese Office Action Corresponding to Chinese Patent Application No. 201380051928.6; Date Mailed: Oct. 10, 2015; Foreign Text, 12 Pages, English Translation Thereof, 11 Pages.

\* cited by examiner

US 9,388,840 B2

CONTROLLED TORQUE FASTENERS AND METHODS FOR USING SAME

RELATED APPLICATION

The present application is a continuation application of and claims priority from U.S. patent application Ser. No. 13/566,322, filed Aug. 3, 2012, the disclosure of which is incorporated herein by reference in its entirety.

FIELD OF THE INVENTION

The present invention relates to fasteners and, more particularly, to controlled torque fasteners.

BACKGROUND OF THE INVENTION

In some applications, it is desirable or necessary to install a fastener, such as a bolt, with a prescribed torque, thereby ensuring that the bolt is installed to a tightness in a desired range. Although a torque-controlled driver (e.g., a torque wrench) may be employed for this purpose, a torque-controlled driver may be unavailable or inconvenient. Torque-controlled fasteners such as shear bolts have been designed to provide torque control integral with the fastener. Examples of shear bolt fasteners include one-piece shear bolts provided with electrical connectors available from TE Connectivity. Some of these shear bolts include a one-piece bolt member having a head, a threaded shaft, and one or more shear sections defined in the shaft. During installation, a driver is used to apply torque to the head until the shaft shears at one of the shear sections, whereupon the head breaks off and a remaining portion of the fastener remains to fasten the subject substrate. In some embodiments, the remaining portion includes a hexagonal head adapted to seat in a drive socket of a driver for removing the bolt.

SUMMARY OF THE INVENTION

According to embodiments of the invention, a controlled torque fastener for use with a substrate includes a first driver engagement feature and a primary fastener portion connected to the first driver engagement feature. The primary fastener portion includes a threaded fastening portion and a second driver engagement feature connected to the threaded fastening portion. The first driver engagement feature is configured to be engaged by a first driver to enable the first driver to tighten the controlled torque fastener onto the substrate until the first driver engagement feature breaks off from the primary fastener portion. The second driver engagement feature includes a socket configured to receive a second driver and to enable the received second driver to apply a torque to the primary fastener portion.

According to method embodiments of the invention, a method tier installing a controlled torque fastener on a substrate includes providing a controlled torque fastener including: a first driver engagement feature; and a primary fastener portion connected to the first driver engagement feature, the primary fastener portion including a threaded fastening portion and a second driver engagement feature connected to the threaded fastening portion. The first driver engagement feature is configured to be engaged by a first driver to enable the first driver to tighten the controlled torque fastener onto the substrate until the first driver engagement feature breaks off from the primary fastener portion. The second driver engagement feature includes a socket configured to receive a second driver and to enable the received second driver to apply a torque to the primary fastener portion. The method further includes: engaging the first driver engagement feature with the first driver; and, using the first driver, applying a tightening torque to the first driver engagement feature to tighten the controlled torque fastener onto the substrate until the first driver engagement feature breaks off from the primary fastener portion.

According to embodiments of the invention, a controlled torque fastener for use with a substrate includes a first member and a second member. The first member includes a threaded fastening portion. The second member includes a driver engagement feature. The first and second members are threadedly engaged with one another. The driver engagement feature is configured to be engaged by a driver to enable the driver to tighten the controlled torque fastener onto the substrate until the driver engagement feature shears off from the threaded fastening portion.

According to method embodiments of the invention, a method for installing a controlled torque fastener on a substrate includes providing a controlled torque fastener including: a first member including a threaded fastening portion; and a second member including a driver engagement feature. The first and second members are threadedly engaged with one another. The driver engagement feature is configured to be engaged by a driver to enable the driver to tighten the controlled torque fastener onto the substrate until the driver engagement feature shears off from the threaded fastening portion. The method further includes: engaging the driver engagement feature with the driver; and using the driver, applying a tightening torque to the driver engagement feature to tighten the controlled torque fastener onto the substrate until the driver engagement feature shears off from the threaded fastening portion.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
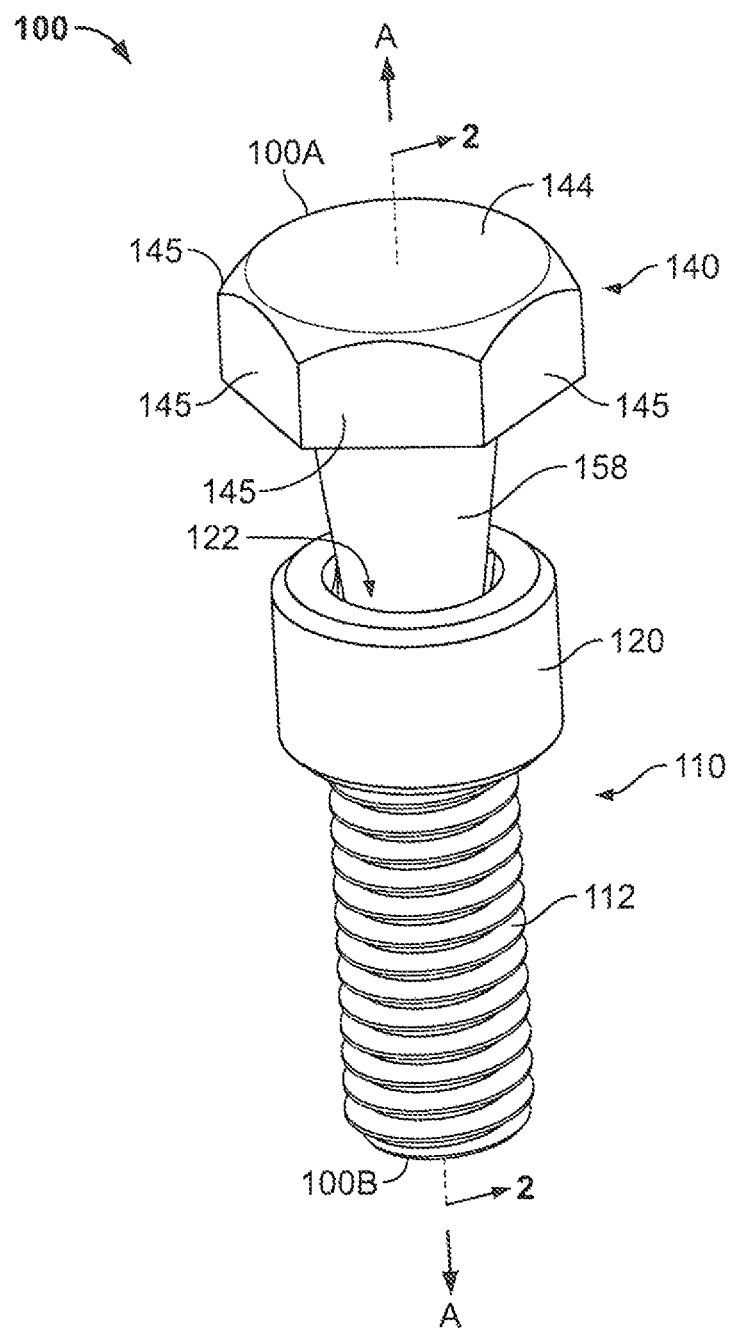
FIG. 1 is a top perspective view of a controlled torque fastener according to embodiments of the present invention.
Figure 2:
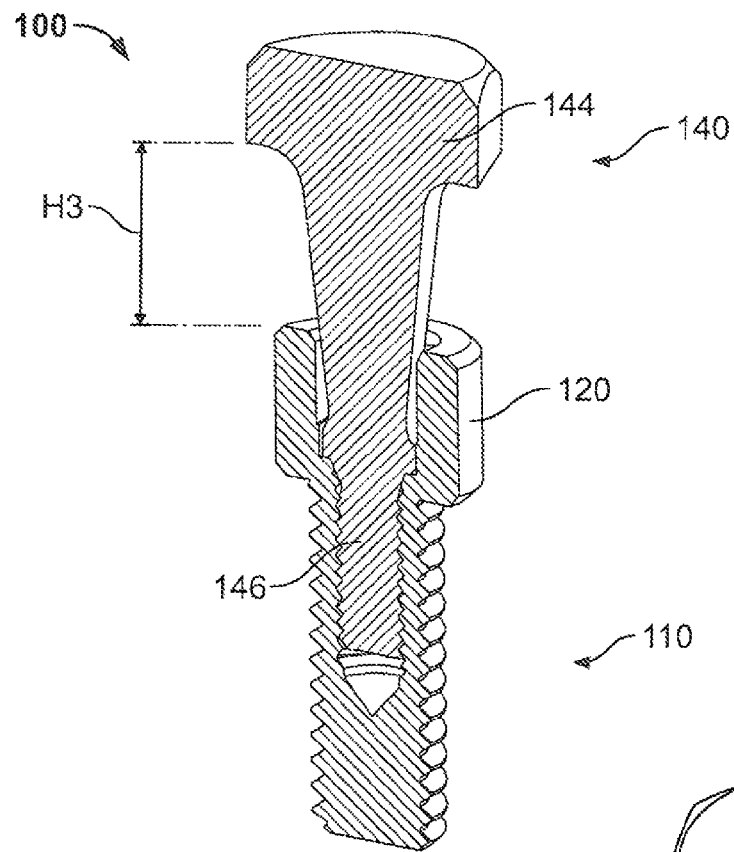
FIG. 2 is a top, perspective, cross-sectional view of the fastener of FIG. 1 taken along the line 2-2 of FIG. 1.
Figure 3:
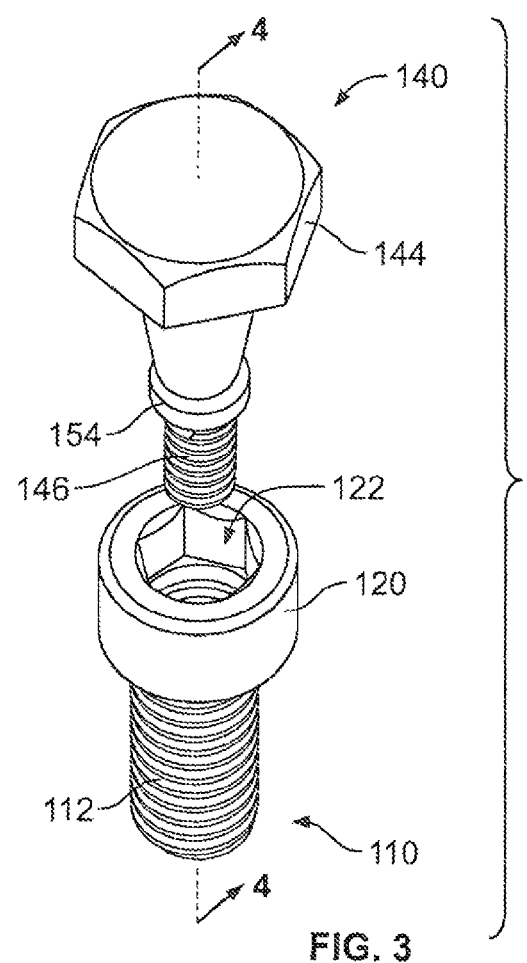
FIG. 3 is an exploded, top perspective view of the fastener of FIG. 1.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "monolithic" means an object that is a single, unitary piece formed or composed of a material without joints or seams.

Figure 8:
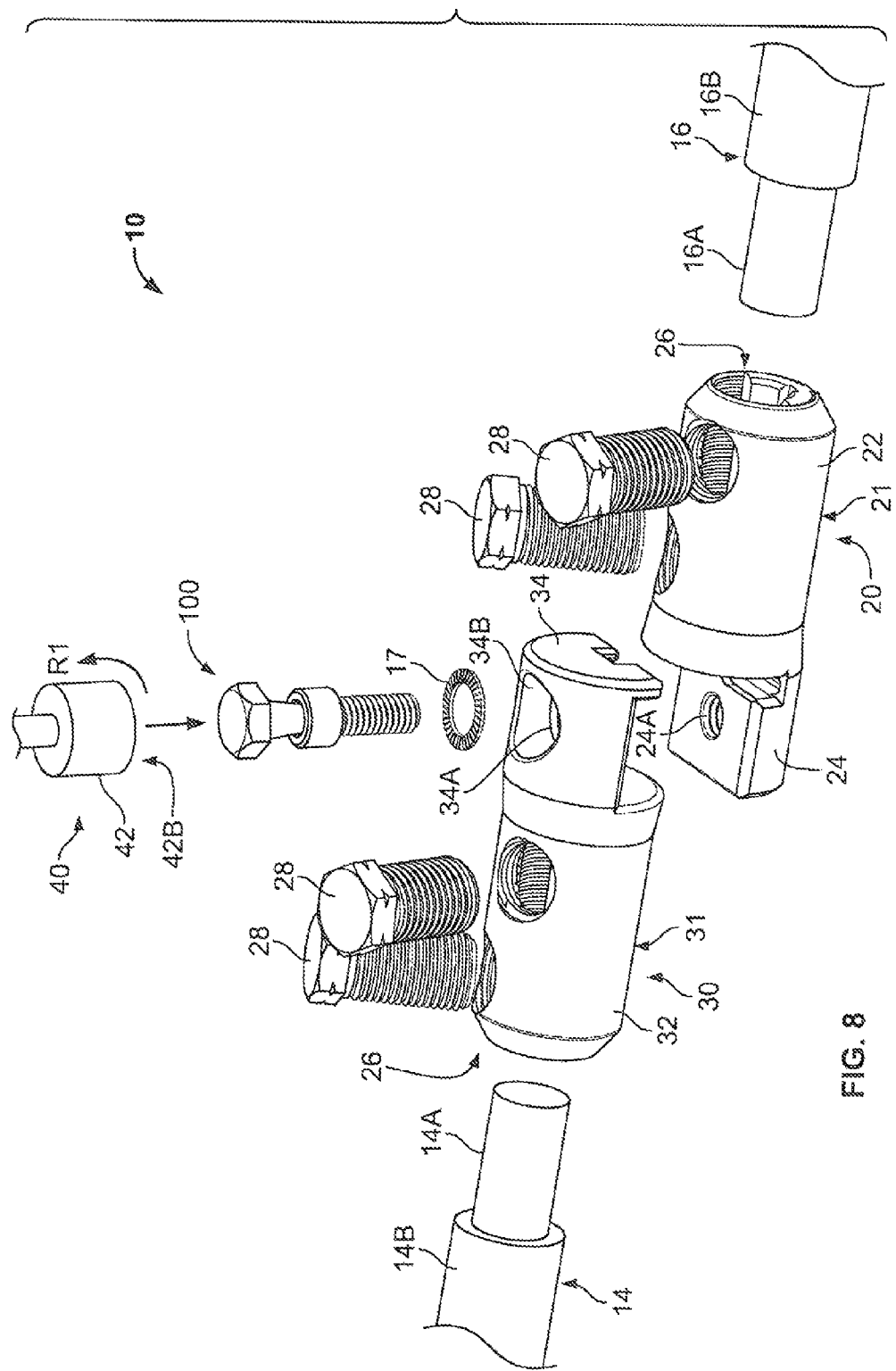
FIG. 8 is an exploded, perspective view of a disconnectable joint assembly according to embodiments of the present invention including the fastener of FIG. 1.
Figure 9:
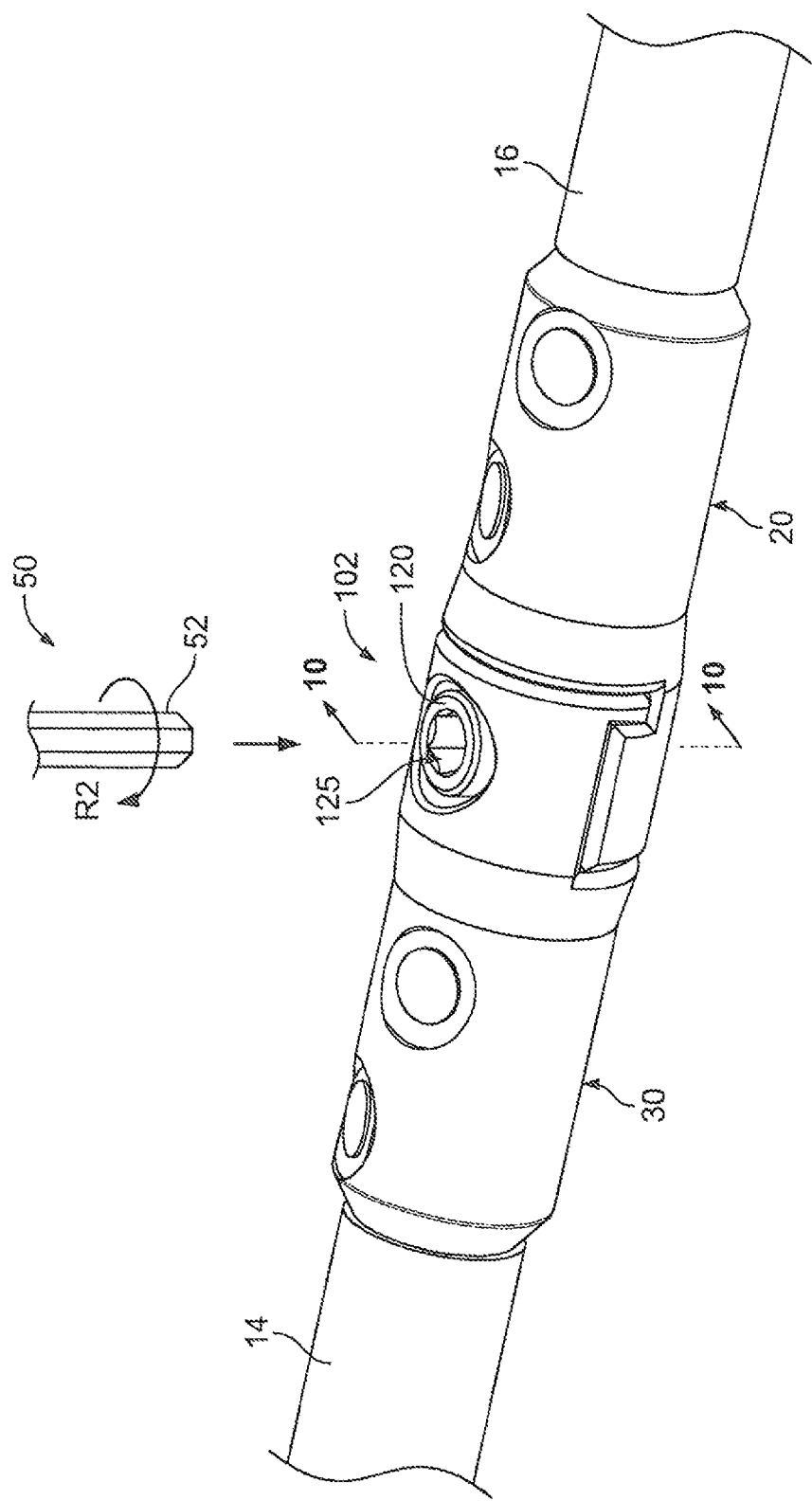
FIG. 9 is a perspective view of the disconnectable joint assembly of FIG. 8 assembled.
Figure 10:
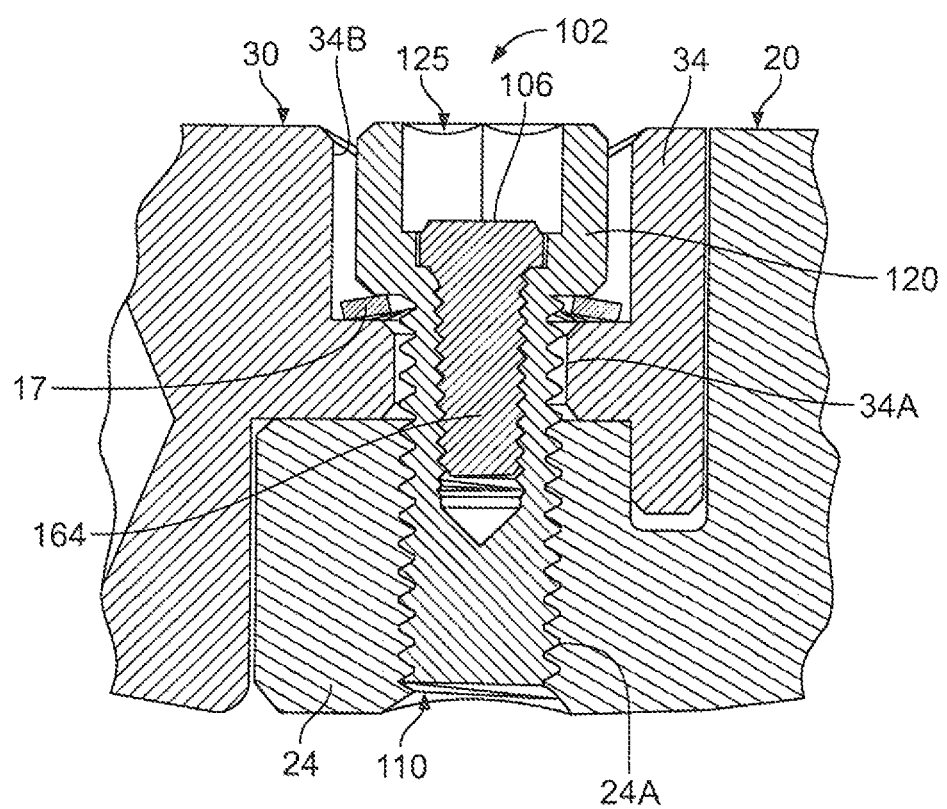
FIG. 10 is an enlarged, fragmentary, cross-sectional view of the disconnectable joint assembly of FIG. 9 taken along the line 10-10 of FIG. 9.

With reference to FIGS. 1-10, a controlled torque fastener 100 according to embodiments of the present invention is shown therein. The fastener 100 is a shear head threaded fastener and, more particularly, a removable shear head threaded bolt fastener. The fastener 100 can be installed on (including in or through) a desired substrate by rotatably tightening the fastener 100 into a cooperating bore having complementary threads. The cooperating threaded bore may form a part of the substrate itself or a separate nut, for example. According to some embodiments, the substrate is an electrical connector. According to some embodiments, the fastener 100 is used to securely couple a pair of electrical connectors to form a disconnectable joint assembly 10 as shown in FIGS. 8-10, for example. The fastener 100 incorporates a torque limiting feature so that it is not necessary to use a separate tool having torque limiting control in order to install the fastener 100 to the correct or desired torque. However, once installed, the fastener 100 can be operatively engaged by a male head of a driver (e.g., a hex key) to apply a removal torque to the fastener 100 in order to loosen or remove the fastener from the substrate.

With reference to FIGS. 1-4, the fastener 100 includes a first member or primary fastener portion in the form of a cap screw 110, and a second member in the form of a shear head member 140. The cap screw 110 and the shear head member 140 are discrete, separately formed parts that are joined as discussed below. The fastener 100 has opposed ends 100A and 100B and a longitudinal axis A-A, which also serves as its rotational axis.

Figure 4:
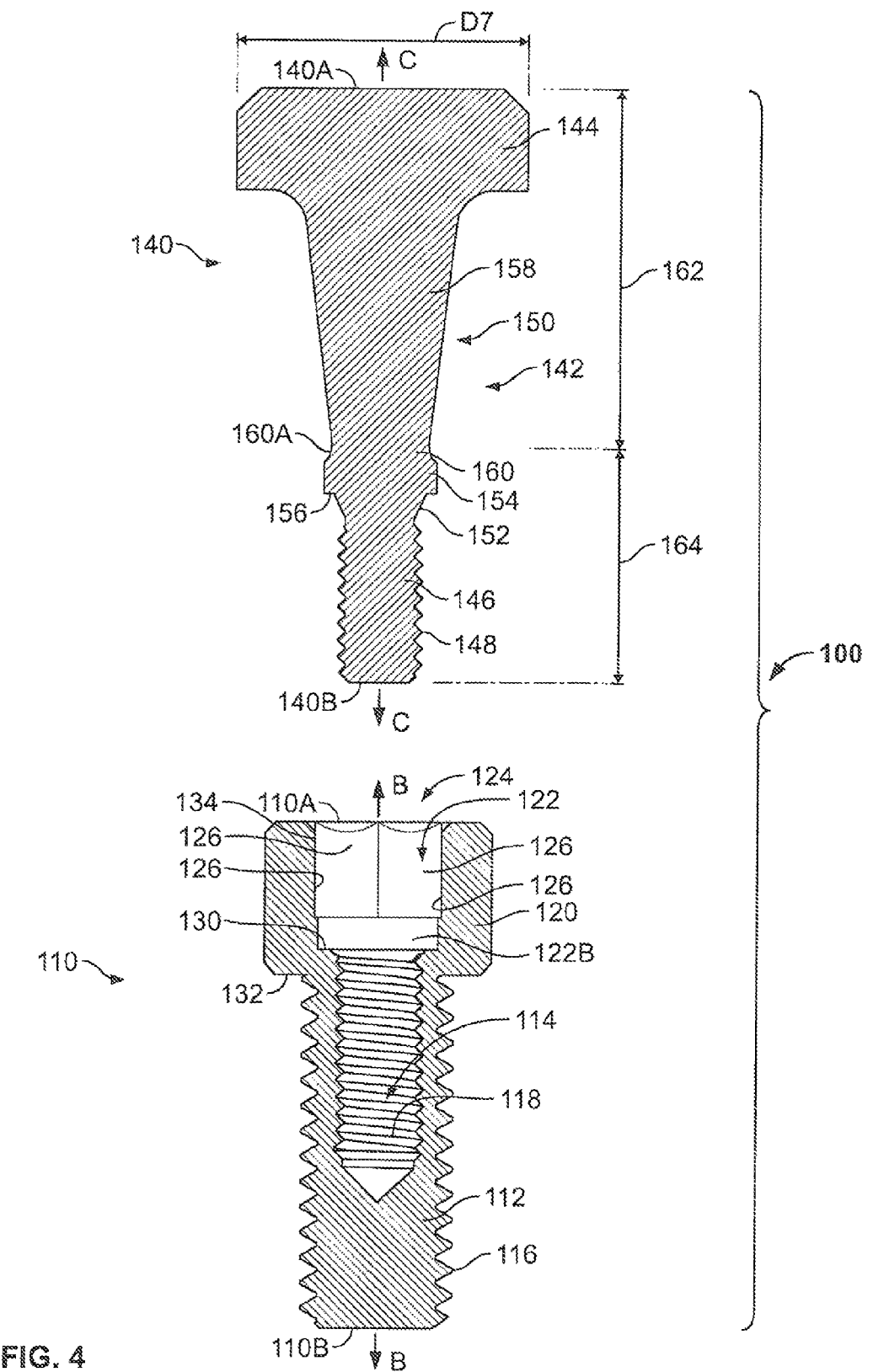
FIG. 4 in an exploded, cross-sectional view of the fastener of FIG. 1 taken along the line 4-4 of FIG. 3.

With reference to FIG. 4, the cap screw 110 has opposed ends 110A, 110B, and a longitudinal and rotational axis B-B that coincides with the axis A-A. The cap screw 110 includes a shaft 112 and a cap or head 120. The shaft 112 has an external or male thread 116. A bore 114 is defined in the shaft 112 and has an inner female thread 118. A cavity 122 and an end opening 124 communicating with the cavity 122 are defined in the head 120. The cavity 122 includes a counterbore or flange receiving portion 122B and a driver socket portion 122A. The head 120 has an annular inner shoulder 130, an annular bottom shoulder 132, and an annular top face 134. Six driver engagement and load transfer faces 126 are circumferentially distributed about the perimeter of the cavity 122 to form sidewalls of a socket 125 as discussed below, it will be appreciated that other shapes of sockets may be employed. However, according to some embodiments, the sidewall faces 126 of the socket 125 define a regular polygon.

The shear head member 140 has opposed ends 140A, 140B and a longitudinal and rotational axis C-C that coincides with the axis A-A. The shear head member 140 includes a shaft 142 and head 144. The shaft 142 includes a threaded section 146 having an external or outer male thread 148. The shaft 142 includes a shank 150 including (ascending from the threaded section 146 to the head 144) a chamfered or conically tapered section 152, an annular radially outwardly projecting flange 154 (having an annular lower abutment face 156), a shear section 160 (surrounded by an annular fillet or rounded groove 160A), and a conically tapered extension section 158. The head 144 has six driver engagement and load transfer faces 145 (FIG. 1) distributed about its perimeter to form a hexagonal cap. It will be appreciated that other shapes may be employed. However, according to some embodiments, the faces 145 define a regular polygon.

The cap screw 110 and the shear head member 140 may be formed of any suitable materials. According to some embodiments, the components 110, 140 are formed of metal. According to some embodiments, the components 110, 140 are formed of copper, aluminum or brass.

The cap screw 110 and the shear head member 140 may be formed by any suitable method. The components 110, 140 may be cast or machined. In some embodiments, the cap screw 110 is a standard cap screw that is reworked to form the threaded bore 114. According to some embodiments, the components 110, 140 are each (individually) integral, unitary members and, according to some embodiments, are each (individually) monolithic. According to some embodiments, the components 110, 140 are each individually formed and thereafter joined as described below to construct the fastener 100.

Figure 5:
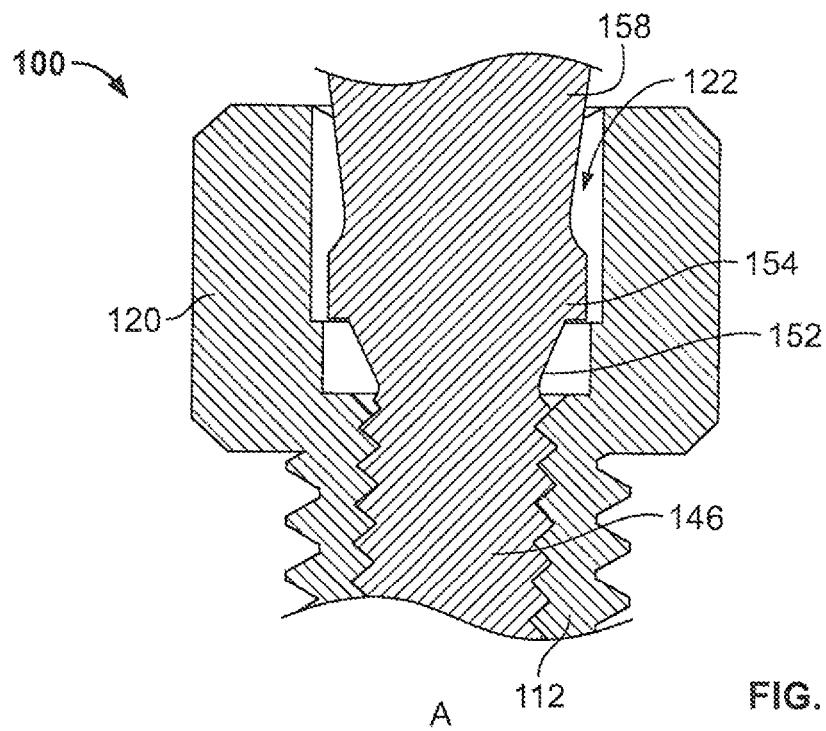
FIG. 5 is an enlarged, fragmentary, cross-sectional view of the fastener of FIG. 1 with a shear head member of the fastener partially installed in a cap screw also forming a part of the fastener.
Figure 6:
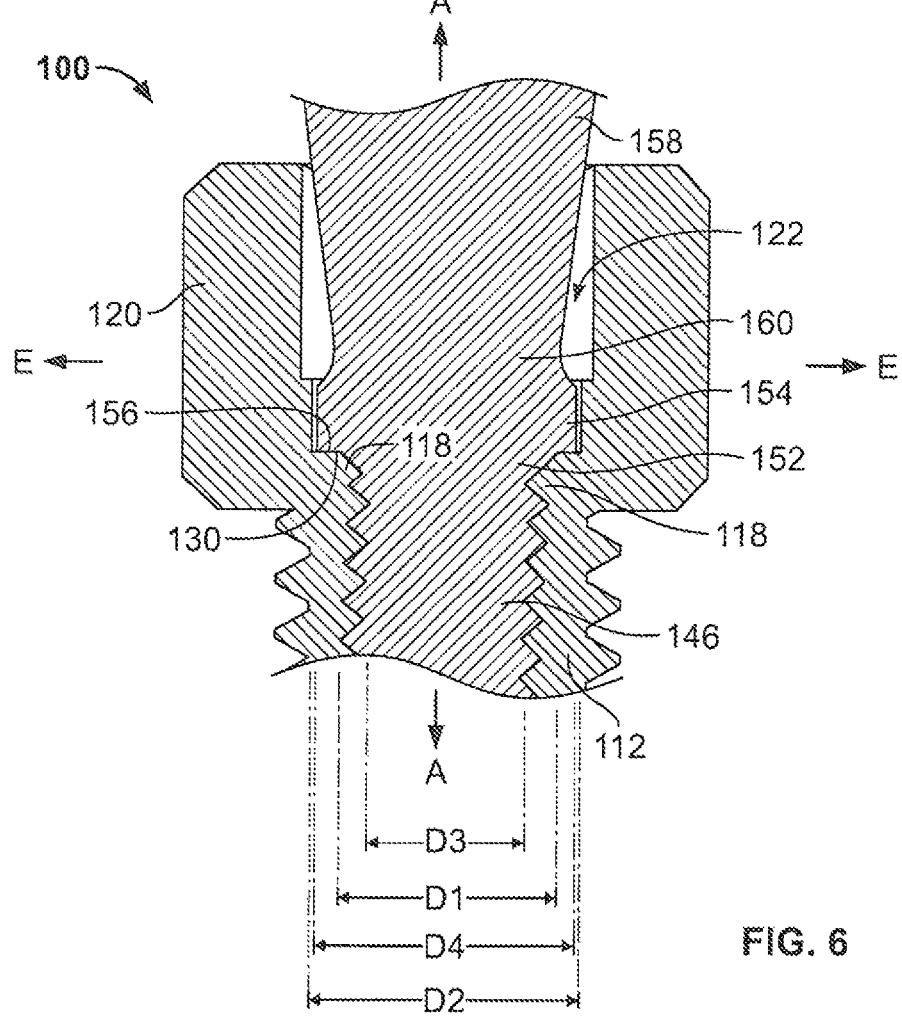
FIG. 6 is an enlarged, fragmentary, cross-sectional view of the fastener of FIG. 1 with the shear head member fully installed in the cap screw.
Figure 7:
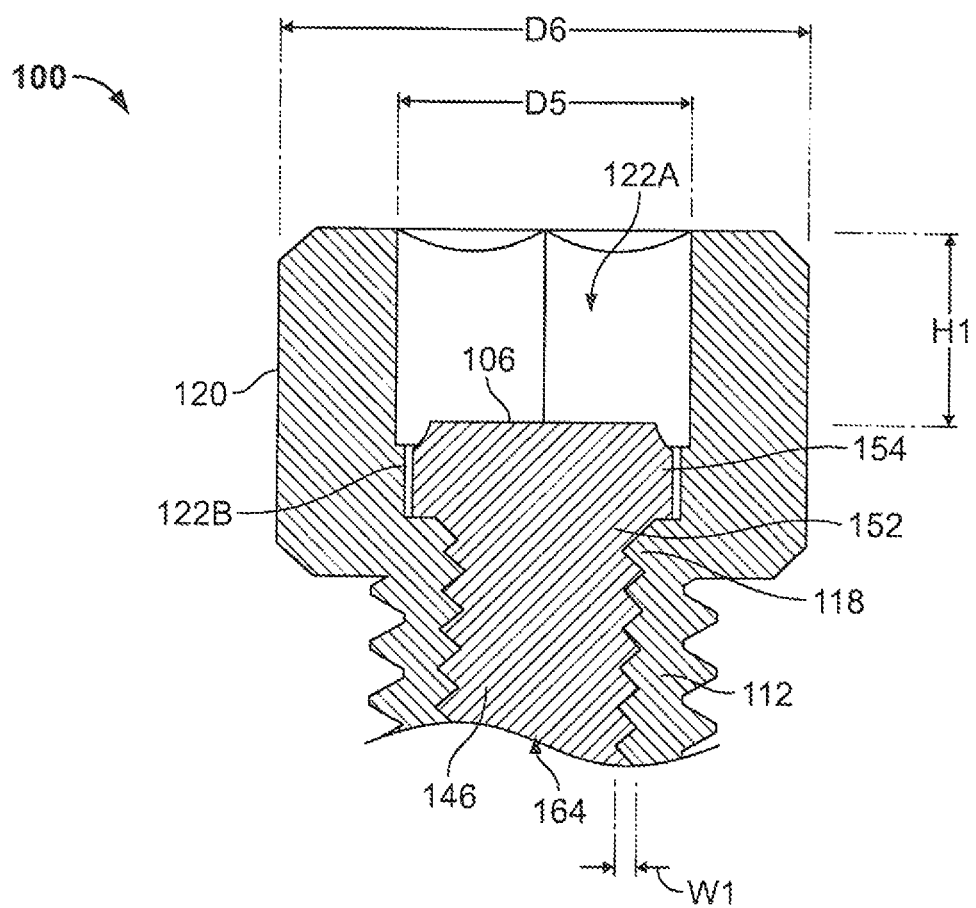
FIG. 7 is an enlarged, fragmentary, cross-sectional view of the fastener of FIG. 1 wherein the shear head member has been sheared and a break off portion thereof has been removed from the cap screw.

The fastener 100 may be assembled as follows as follows in accordance with some embodiments of the invention. The threaded shaft 146 of the shear head member 140 is inserted through the opening 124 and screwed into the threaded bore 114 of the cap screw 110 as shown in FIG. 5. The shear head member 140 is further screwed into the threaded bore 114 until the abutment face 156 of the stop flange 154 abuts the shoulder 130 to limit or prevent farther axial displacement of the shah 146 into the bore 114. As the shear head member 140 is screwed into this position, the taper of the chamfer section 152 introduces a wedge interference with the threads 118 and the upper threads 119 of the bore 114 cut and embed into the nonthreaded chamfered section 152 (which has a greater diameter than the major diameter of the threads 118), as shown in FIG. 6. The fastener 100 is thus assembled. According to some embodiments, fastener 100 is assembled at the factory and provided to the customer or installer as an assembled unit. In other embodiments, the cap screw 110 and the shear head 140 are provided to the customer or installer as loose parts that are assembled in the field, for example. According to some embodiments, the fastener 100 is assembled prior to installing the cap screw 110 on an intended substrate. However, the cap screw 110 may also be mounted on a substrate (e.g., the threaded shaft 112 screwed into a threaded bore of the substrate or a nut) and the shear head member 140 thereafter installed in the cap screw 110 as described to further drive the cap screw 110 with torque control.

In the assembled fastener 100, the shear section 160 is disposed in the cavity 122 and the extension section 158 extends through the cavity 122 and the opening 124 and projects upwardly from the head 120 so that the head 144 is spaced above the head 120.

According to some embodiments, the head 144 is spaced from the head 120 a distance 113 (FIG. 2) in the range of from about 0.25 to 1 inch.

According to some embodiments, the diameter D1 (FIG. 6) of the shear section 160 is greater than the minor diameter D3 (FIG. 6) of the threaded section 146. According to some embodiments, the diameter D3 is in the range of from about 65 to 75 percent of the diameter D1.

According to some embodiments, the diameter D1 is less than the minor diameter D2 (FIG. 6) of the cap screw threaded shaft 112. According to some embodiments, the diameter D1 is in the range of from about 80 to 85 percent of the diameter D2.

According to some embodiments, the diameter D1 (FIG. 6) of the stop flange 154 is in the range of from about 85 to 95 percent of the diameter D4. According to some embodiments, the diameter D4 is in the range of from about 0.25 to 0.50 inch.

According to some embodiments, the thread 118 embeds in the chamfered section 152 a depth W1 (FIG. 7) in the range of from about 0.020 to 0.060 inch. According to some embodiments, the chamfered section 152 is tapered at an angle in the range of from about 20 to 50 degrees.

According to some embodiments, the outer diameter D6 (FIG. 7) of the head 120 is in the range of from about 55 to 75 percent of the nominal outer diameter D6 (FIG. 7) of the cavity socket portion 122A.

According to some embodiments, the nominal outer diameter 117 (FIG. 4) of the head 144 is greater than the outer diameter D6 of the head 120. According to some embodiments, the diameter 96 is in the range of from about 65 to 75 percent of the diameter D7.

Methods for using the fastener 100 will now be described with reference to FIGS. 8-10 and assembly of the disconnectable joint assembly 10. However, it will be appreciated that the fastener 100 (and other controlled torque fasteners according to embodiments of the present invention) may be used in other applications with other types of substrates.

The joint assembly 10 may be a disconnectable joint assembly as disclosed in U.S. patent application Ser. No. 13/565,687, filed Aug. 2, 2012, the disclosure of which is incorporated herein by reference. The assembly 10 includes the fastener 100, a washer 17, a first metal connector 20, and a second metal connector 30. The first connector 20 includes a connector body 21 having a main portion 22 and a coupling portion tab or lug 24. A threaded coupling bore 24A extends transversely through the lug 24. The second connector 30 includes a connector body 31 having a main portion 32 and a nonthreaded coupling portion, tab or lug 34, a nonthreaded bore 34A extending transversely through the lug 34, and a counterbore 34B over the bore 34A. Each connector 20, 30 has a conductor bore 26 and conductor clamping bolts 28 to receive and capture an electrical conductor 14A, 16A of a respective electrical power transmission cable 14, 16. The cables 14, 16 may be of any suitable type and may include an electrically insulating jacket 148, 168.

The fastener 100 can be used as follows to disconnectably couple the connectors 20, 30. The lugs 24, 34 are positioned so that the bores 24A, 34A are aligned. The threaded shall 112 about the cap screw 110 is inserted through the washer 17 and the bore 34A and screwed into the threaded bore 24A. Before or upon meeting significant resistance, a driver 40 having a head 42 is operatively engaged with the head 144, which serves as a driver engagement feature. The driver head 42 includes a socket 428 having a shape (e.g., a hex socket) complementary to the shape of the head 144. The head 144 is received in the socket 42B.

The driver 40 is used to drive the fastener 100, that is, to apply a torque to the head 144 tending to forcibly rotate the head 144 in a tightening direction R1. The driver 40 is used to drive the fastener 100 until a prescribed installation torque (or torque within a prescribed range) is applied to the head 144, responsive to which the shear head member 140 shears in or at the shear section 160. According to some embodiments, the shear head member 140 shears generally along a shear plane (FIG. 6) that is transverse to and, in some embodiments, substantially orthogonal to, the axis A-A of rotation.

Upon shearing, a break off portion 162 (FIG. 4; including the extension section 158 and the head 144) above the shear location detaches or breaks off from a remaining portion 164 (including the flange 154, and the threaded section 146) of the shear head member 140 below the shear location. The break off portion 162 is removed from the cavity 122 and may be discarded. The cap screw 110 and the remaining portion 164 of the shear head member 140 collectively form the installed fastener 102.

The shear location (e.g., at the shear plane E-E) is located in the cavity 122 so that the remaining portion 164 disposed in the cavity portion 122B is recessed from the opening 124 and, with the surrounding engagement faces 126, defines a driver receiving socket 125. According to some embodiments, a substantially planar end face 106 is presented at the upper end of the remaining portion 164 so that the socket 125 has a substantially flat bottom. According to some embodiments, the depth H1 (FIG. 7) of the socket 125 is at least 50 percent of the socket diameter D5. According to some embodiments, the depth H1 is in the range of from about 0.20 to 0.30 inch. According to some embodiments, the depth H1 is compliant with ASME standard B18.3-2003 for cap screws.

The fastener 100 is thereby installed on the connectors 20, 30 to mechanically and electrically connect the connectors 20, 30 and thereby the cables 14, 16.

If it is subsequently desired to disconnect the connectors 20, 30 (and thereby the cables 14, 16) from each other, an operator can insert a head 52 of a driver 50 (FIG. 9) into the socket 125, which serves as a driver engagement feature. The driver head 52 may be a key (e.g., a hexagonal key) having a shape complementary to the driver engagement faces 126. The driver 50 is used to forcibly rotate the cap screw 110 in a loosening direction R2. Once loosened, the fastener 102 can be removed from the connectors 20, 30. Thus, according to some embodiments, the fastener 102 can be removed without specialized tools.

The prescribed shear or break off torque value (i.e., the torque value at which the shear head member 140 shears apart at the shear section 160) or range of values can be set or tuned by selecting the appropriate material or materials and geometry for the shear head member 140. In some embodiments, the prescribed shear torque value is determined by selection of the diameter of the shear section 140.

In some embodiments, a plurality of shear head members 140 having different prescribed break off torque values (e.g., each having a shear section 160 of a different diameter) are provided. The desired break off torque value of the fastener 100 is determined. The shear head member 140 having the corresponding (or nearest corresponding) prescribed break off torque value is installed on the cap screw 110 as described to provide a fastener 100 having the appropriate shear torque value. In this manner, controlled torque fasteners as described herein can be flexibly assembled or customized in the factory or in the field using a given primary fastener member 110.

According to some embodiments, the prescribed shear torque value of the fastener 100 (i.e., of the section 160) is in the range of from about 15 to 30 ft-lbs and, according to some embodiments, in the range of from about 45 to 60 ft-lbs.

Controlled torque fasteners according to embodiments of the invention can provide a number of advantages. The installed fastener that remains after the break off portion has been removed can have a form factor the same as or similar to a standard recognized fastener in the industry. The fastener can be constructed, in part, from such a fastener rather than being wholly specialized or machined from raw material.

In the installed fastener 102, no sharp edges are left behind that may cut or damage an elastomeric insulating sleeve about the connector assembly 10, for example. The installed fastener 102, which terminates with the head 120, can have a low profile, allowing the counterbore 34B in the connector to be shallow. A small counterbore 34B is desirable to maximize the amount of copper mass for electrical conductivity as well as to aid in hiding the fastener head so that there are no sharp or irregular protrusions in either the connector or the fastener.

Nonetheless, the socket 125 can be formed to have a sufficient depth to reliably engage a driver to remove the installed fastener 102.

It has been found that the torque shear strength of a given screw is approximately equal to the typically intended installation torque of a screw (of the same construction) one or two standard sizes larger than the given screw. Thus, by mounting a shear head member 140 in the cap screw 110 having a shear section 160 diameter one or two standard sizes less than the minor diameter of the threaded shaft 112, the intended installation torque of the cap screw 110 can be achieved when the break off portion 162 shears off.

The seating or bottoming of the stop flange 154 against the bottom of the cavity 122, as well as the thread cutting and binding between the thread 118 and the chamfered section 152, serve to ensure that the weakest section to which torque applied to the head 144 will be transferred is no longer below the flange 154. Instead, a shear plane or weakest point subjected to the applied torque is purposely located above the flange 154 at the shear section 160. According to some embodiments, the shear strength of the shear section 160 is greater than the shear strength of the minor diameter of the threaded section 146 of the shear head member 140. Thus, the break off torque of the fastener (i.e., the torque at which the head 144 will separate from the cap screw 110) is not limited by the diameter of the threaded section 146 (which itself may be limited by the dimensions of the cap screw 110.

Various alternative embodiments may include inventive aspects as described herein with modifications. In some embodiments, a controlled torque fastener may be formed as a single, monolithic member designed to provide a drive socket (for fastener removal) after a shear head portion of the fastener is broken off. In some embodiments, a controlled torque fastener may be formed with a primary fastener member and a shear head member screwed together as discussed herein, but wherein, after the shear head member is broken off, the driver engagement feature is a male driver engagement structure (rather than a socket) or no driver engagement feature is provided.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A controlled torque fastener for use with a substrate, the controlled torque fastener comprising:
    a first member including a threaded fastening portion; and
    a second member including a driver engagement feature;
    wherein:
        the first and second members are threadedly engaged with one another;
        the driver engagement feature is configured to be engaged by a driver to enable the driver to tighten the controlled torque fastener onto the substrate until the driver engagement feature shears off from the threaded fastening portion;
        the second member includes:
            a break off portion including the driver engagement feature; and a shear section connecting the break off portion to the first member;

the controlled torque fastener is configured to shear at the shear section upon application of a sufficient torque to the driver engagement feature, whereby the break off portion is detached from the first member and a remaining portion of the second member is retained on the first member;

the first member has a threaded bore defined therein;

the second member includes a threaded shaft threadedly received in the threaded bore; and the shear section is located between the threaded shaft and the break off portion;

the second member includes a nonthreaded section between the shear section and the threaded shaft; and female threads of the threaded bore are embedded in the nonthreaded section.

2. The controlled torque fastener of claim 1 wherein the break off portion includes an extension section connecting the driver engagement feature to the shear section, wherein the extension section is tapered from the driver engagement feature to the shear section.

3. The controlled torque fastener of claim 1 wherein the second member includes a stop flange between the threaded shaft and the shear section to limit axial displacement of the threaded shaft into the threaded bore.

4. The controlled torque fastener of claim 1 wherein the shear section has a diameter that is greater than a minor diameter of the threaded shaft.

5. A method for installing a controlled torque fastener on a substrate, the method comprising:
providing a controlled torque fastener including:
a first member including a threaded fastening portion; and
a second member including a driver engagement feature;
wherein:
the first and second members are threadedly engaged with one another;
the driver engagement feature is configured to be engaged by a driver to enable the driver to tighten the controlled torque fastener onto the substrate until the driver engagement feature shears off from the threaded fastening portion;
the second member includes:
a break off portion including the driver engagement feature; and
a shear section connecting the break off portion to the first member;
the controlled torque fastener is configured to shear at the shear section upon application of a sufficient torque to the driver engagement feature, whereby the break off portion is detached from the first member and a remaining portion of the second member is retained on the first member;
the first member has a threaded bore defined therein;
the second member includes a threaded shaft threadedly received in the threaded bore; and
the shear section is located between the threaded shaft and the break off portion;
the second member includes a nonthreaded section between the shear section and the threaded shaft; and
female threads of the threaded bore are embedded in the nonthreaded section;
engaging the driver engagement feature with the driver; and using the driver, applying a tightening torque to the driver engagement feature to tighten the controlled torque fastener onto the substrate until the driver engagement feature shears off from the threaded fastening portion.

6. The method of claim 5 wherein the break off portion includes an extension section connecting the driver engagement feature to the shear section, wherein the extension section is tapered from the driver engagement feature to the shear section.

7. The method of claim 5 wherein the second member includes a stop flange, between the threaded shaft and the shear section to limit axial displacement of the threaded shaft into the threaded bore.

8. The method of claim 5 wherein the shear section has a diameter that is greater than a minor diameter of the threaded shaft.

9. A controlled torque fastener for use with a substrate, the controlled torque fastener comprising:
a first member including:
a threaded fastening portion; and
an internally threaded bore; and
a second member including:
a driver engagement feature;
an externally threaded shaft;
a break off portion including the driver engagement feature; and
an integral shear section connecting the break off portion to the externally threaded shaft;
wherein:
the externally threaded shaft is threadedly received in the threaded bore such that a thread of the externally threaded shaft is threadedly mated with a thread of the internally threaded bore;
the driver engagement feature is configured to be engaged by a driver to enable the driver to tighten the controlled torque fastener onto the substrate until the driver engagement feature shears off from the threaded fastening portion; and
the controlled torque fastener is configured to shear at the shear section upon application of a sufficient torque to the driver engagement feature, whereby the break off portion is detached from the externally threaded shaft and the externally threaded shaft is retained in the internally threaded bore of the first member.

10. The controlled torque fastener of claim 9 wherein the break off portion includes an extension section connecting the driver engagement feature to the shear section, wherein the extension section is tapered from the driver engagement feature to the shear section.

11. The controlled torque fastener of claim 9 wherein the second member includes a stop flange between the threaded shaft and the shear section to limit axial displacement of the externally threaded shaft into the internally threaded bore.

12. The controlled torque fastener of claim 9 wherein the shear section has a diameter that is greater than a minor diameter of the externally threaded shaft.

13. A method for installing a controlled torque fastener on a substrate, the method comprising:
providing a controlled torque fastener including:
a first member including:
a threaded fastening portion; and
an internally threaded bore; and
a second member including:
a driver engagement feature;
an externally threaded shaft;

a break off portion including the driver engagement feature; and an integral shear section connecting the break off portion to the externally threaded shaft;

wherein:

the externally threaded shaft is threadedly received in the threaded bore such that a thread of the externally threaded shaft is threadedly mated with a thread of the internally threaded bore;

the driver engagement feature is configured to be engaged by a driver to enable the driver to tighten the controlled torque fastener onto the substrate until the driver engagement feature shears off from the threaded fastening portion; and the controlled torque fastener is configured to shear at the shear section upon application of a sufficient torque to the driver engagement feature, whereby the break off portion is detached from the externally threaded shaft and the externally threaded shaft is retained in the internally threaded bore of the first member;

engaging the driver engagement feature with the driver; and using the driver, applying a tightening torque to the driver engagement feature to tighten the controlled torque fastener onto the substrate until the driver engagement feature shears off from the threaded fastening portion.

14. The method of claim 13 wherein the break off portion includes an extension section connecting the driver engagement feature to the shear section, wherein the extension section is tapered from the driver engagement feature to the shear section.

15. The method of claim 13 wherein the second member includes a stop flange between the externally threaded shaft and the shear section to limit axial displacement of the threaded shaft into the internally threaded bore.

16. The method of claim 13 wherein the shear section has a diameter that is greater than a minor diameter of the externally threaded shaft.

* * * * *